(12) United States Patent
Kim

(10) Patent No.: US 7,150,825 B2
(45) Date of Patent: Dec. 19, 2006

(54) SEALING APPARATUS OF FUEL FILTER

(75) Inventor: Sung-Hak Kim, Jeollabuk-do (KR)

(73) Assignee: Hyundai Motor Company, Seoul (KR)

( * ) Notice: Subject to any disclaimer, the term of this patent is extended or adjusted under 35 U.S.C. 154(b) by 391 days.

(21) Appl. No.: 10/749,239

(22) Filed: Dec. 30, 2003

(65) Prior Publication Data

US 2005/0067335 A1    Mar. 31, 2005

(30) Foreign Application Priority Data

Sep. 26, 2003   (KR) .................. 10-2003-0066789

(51) Int. Cl.
*B01D 35/14*   (2006.01)
*F16K 25/00*   (2006.01)

(52) U.S. Cl. .................. 210/97; 137/454.6; 137/455; 137/494; 210/136; 210/418

(58) Field of Classification Search ............ 137/454.6, 137/455, 494, 511; 210/136, 137, 418, 435, 210/541, 97, 110; 251/62, 63
See application file for complete search history.

(56) References Cited

U.S. PATENT DOCUMENTS

| | | | | |
|---|---|---|---|---|
| 2,756,771 A | * | 7/1956 | Spencer | 137/494 |
| 3,045,695 A | * | 7/1962 | Douglas | 137/494 |
| 3,289,841 A | * | 12/1966 | Quinting | 210/134 |
| 3,452,776 A | * | 7/1969 | Chenoweth | 137/454.6 |
| 3,926,806 A | * | 12/1975 | Gaudet et al. | 210/137 |
| 4,702,790 A | * | 10/1987 | Hogh et al. | 156/293 |
| 4,997,555 A | * | 3/1991 | Church et al. | 210/136 |

FOREIGN PATENT DOCUMENTS

JP           08-210211           8/1996

* cited by examiner

*Primary Examiner*—Joseph Drodge
(74) *Attorney, Agent, or Firm*—Morgan Lewis & Bockius LLP

(57)   ABSTRACT

A fuel filter sealing apparatus to improve a connector for connecting a fuel input pipe and a fuel return pipe to a fuel filter in order to prevent fuel leakage during a preliminary testing stage of an engine and backflow of fuel during engine operation. An oil chamber is provided between a first piston and a second piston accommodated at an inner circumferential side of a fuel filter side connecting part. Fuel flow holes are radially formed at an external side of the oil chamber and inlets thereof are opened and closed by the first piston to allow the fuel passing through outlets thereof to flow to the fuel filter. A barrier valve is provided at one side with a valve surface for opening and closing a fuel through hole disposed between the fuel filter and the connector.

4 Claims, 2 Drawing Sheets

SEALING APPARATUS OF FUEL FILTER

CROSS-REFERENCE TO RELATED APPLICATIONS

This application claims priority of Korean Application No. 10-2003-0066789, filed on Sep. 26, 2003, the disclosure of which is incorporated fully herein by reference.

FIELD OF THE INVENTION

The present invention relates to a sealing apparatus of a fuel filter and, more particularly, to a sealing apparatus of a fuel filter adapted to improve the structure for connecting a fuel infuse or input pipe and a fuel return pipe at one side of a housing of a fuel filter, thereby preventing fuel leakage during a preliminary testing stage of an engine and backflow of fuel during engine operation.

BACKGROUND OF THE INVENTION

Vehicles are operated by power generated from the process of burning fuel. A vehicle has an engine mounted at a front or a rear part thereof. A vehicle also has a fuel tank for storing fuel necessary for operation of the engine. A fuel line is formed between the fuel tank and the engine for feeding the fuel pumped from the fuel tank to the engine. The fuel line includes a fuel supply line to allow fuel to flow from the fuel tank side of the engine to the engine, and a fuel return line for returning residual fuel to the fuel tank when there is remaining fuel after the fuel has been supplied to the engine.

Meanwhile, a vehicle engine is manufactured in an engine assembly line separate from a finished vehicle assembly line, and goes through an appropriate pre-test process. Once the engine passes a standard level, it is transferred to a finished vehicle assembly line to be mounted in a vehicle.

The engine pre-test process tests whether an engine is operational. In order to start the engine for pre-testing, a fuel filter mounted at one side of the engine is forcibly fed with an appropriate amount of fuel necessary for operation during the pre-testing period.

However, there is a problem in that, when an engine that has passed the pre-testing is transferred to a finished vehicle assembly line to be mounted in a vehicle, and a cap blocking a connector of the fuel filter is removed, fuel remaining in the fuel filter flows out of the filter, resulting in contamination of surroundings and waste of fuel. This problem occurs not only in a finished vehicle assembly line but also in engine maintenance.

SUMMARY OF THE INVENTION

The present invention provides a fuel filter sealing apparatus adapted to improve a structure for connecting a fuel input pipe and a fuel return pipe at one side of a housing of a fuel filter, thereby preventing fuel leakage during a preliminary testing stage of an engine and reverse flow of fuel during engine operation.

In accordance with a preferred embodiment of the present invention, the sealing apparatus of a fuel filter comprises a body formed with a fuel filter side connecting part inserted into a connector of a fuel filter and a fuel line side connecting part connected to a fuel line. An oil chamber is provided between a first piston and a second piston accommodated at an inner circumferential side of the fuel filter side connecting part of the body. Fuel flow holes are radially formed at an external side of the oil chamber, and inlets thereof are opened and closed by the first piston and are formed to allow the fuel having passed through outlets thereof to flow to a fuel pipe in the fuel filter. A barrier valve is provided at one side of the connector with a valve surface for opening and closing a fuel through hole disposed between the fuel pipe in the fuel filter and the connector, and also provided at the other side of the barrier valve is the second piston and spring that are applied with forces of opposite directions.

BRIEF DESCRIPTION OF THE DRAWINGS

The foregoing aspects and other features of the invention are explained in the following description, taken in connection with the accompanying drawings, in which.

DETAILED DESCRIPTION OF THE INVENTION

The preferred embodiment of the present invention will now be described in detail with reference with the annexed drawings.

Figure 1:
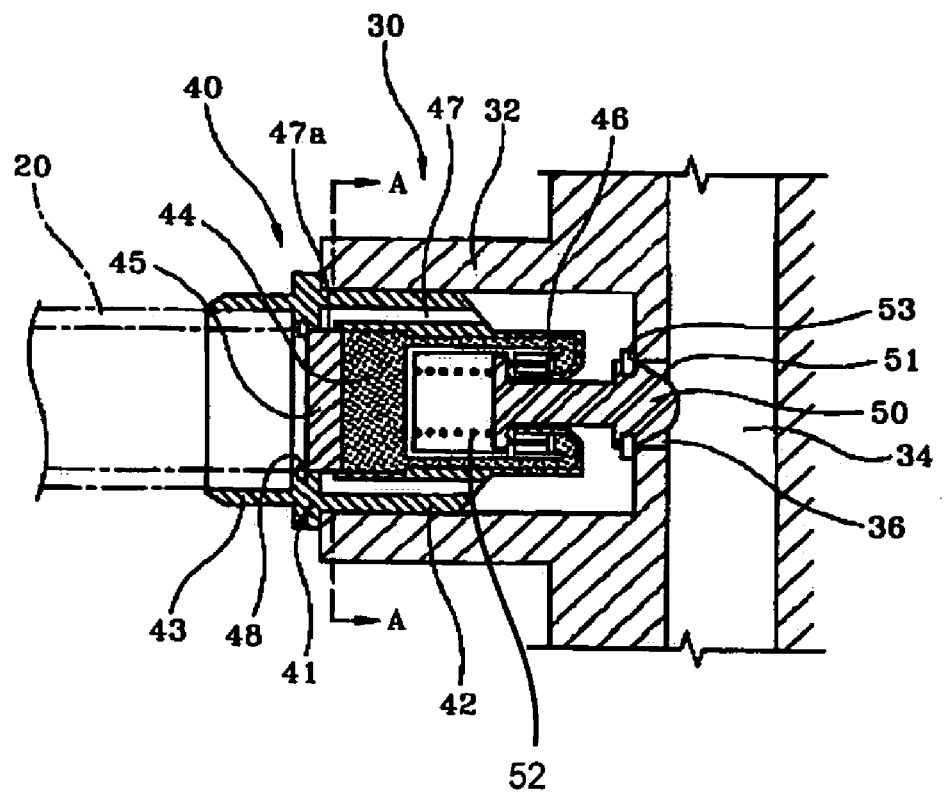
FIG. 1 is a cross-sectional view of a sealing apparatus of a fuel filter according to an embodiment of the present invention.
Figure 2:
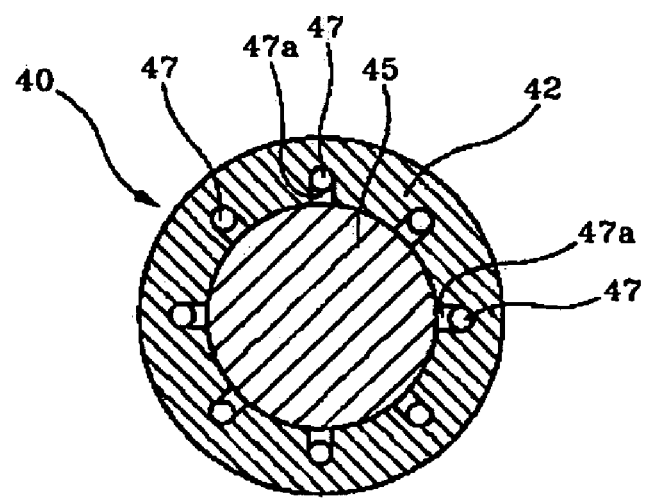
FIG. 2 is a cross-sectional view taken along line A—A of FIG. 1.
Figure 3:
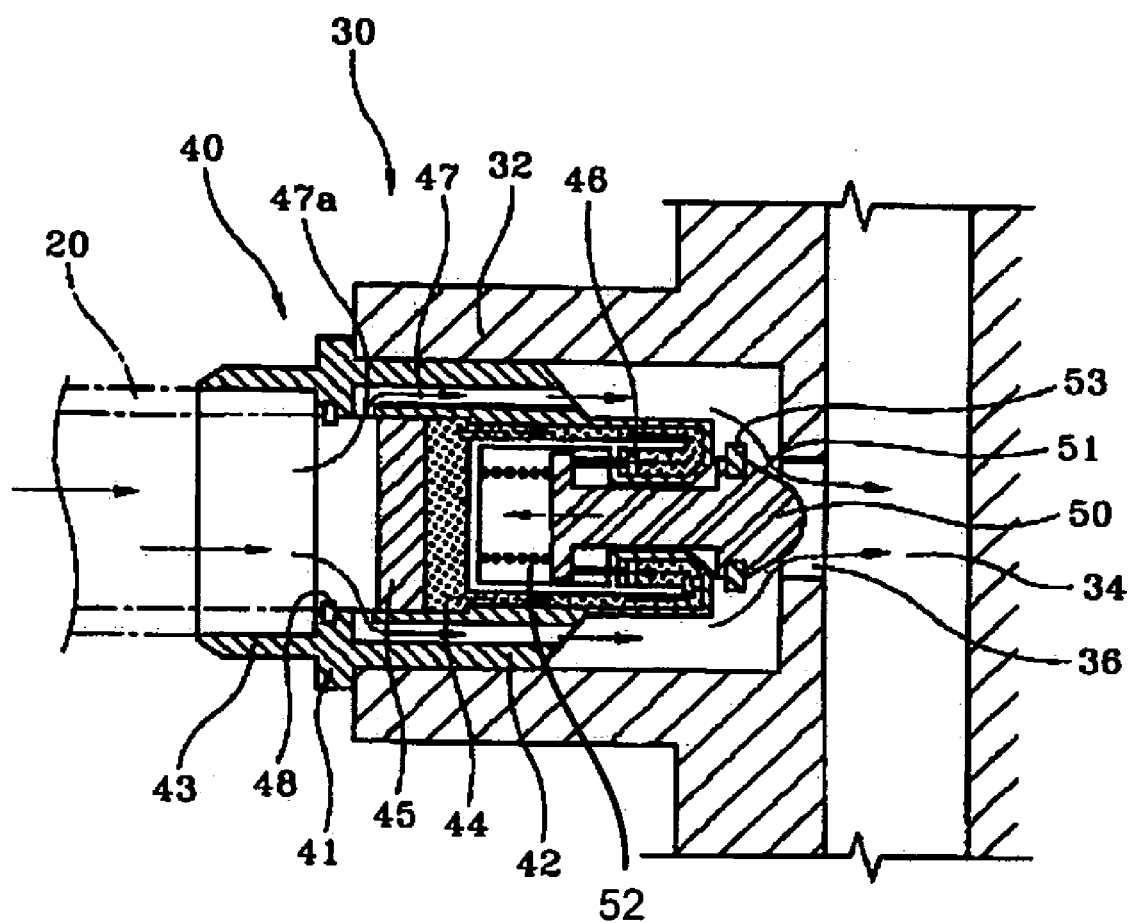
FIG. 3 is an operational constitutional drawing of a sealing apparatus of a fuel filter according to an embodiment of the present invention.

Referring to FIGS. 1, 2 and 3, reference numeral 30 is a fuel filter formed by the present invention, and 40 is a seal apparatus formed by the present invention.

A fuel filter 30 is protrusively formed at one side of a body with a connector 32 for connecting a fuel line 20 to a fuel supply line, a fuel return line and the like.

The connector 32 of the fuel filter 30 is mounted with a sealing apparatus 40 for preventing a backflow of fuel coming from a fuel feeding pipe 34 disposed within a fuel filter and for allowing the fuel to be infused or input from the fuel line 20.

In the sealing apparatus 40 thus described, a fuel filter side connecting part 42 is formed at one side of a body 41 for being inserted into the connector 32 of the fuel filter 30. The other side of body 41 includes a fuel line side connector 43 configured to be connected to the fuel line 20.

An inner side of the fuel filter side connecting part 42 of the body 41 is provided with an oil chamber 44 where oil is filled for opening a barrier valve 50 (described later). The fuel filter side connecting part 42 is cylinder shaped for enclosing the oil chamber 44. A first piston 45 is formed on one side of oil chamber 44. First piston 45 functions as a wall so that pressure can be applied when high pressure fuel pumped from a fuel tank via the fuel line 20 is introduced.

Meanwhile, when the pumping pressure of the fuel is transmitted as mentioned above, the other side of the oil chamber 44 is operatively accommodated with a second piston 46 to allow the first piston 45 to move when a pressure large enough to move the position of the first piston 45 is transmitted to the oil chamber 44.

One side of the oil chamber 44 accommodating the second piston 46 is formed in the shape of a double cylinder, and a distal end of the oil chamber 44 is bent inwardly to allow the first piston 45 and the second piston 46 to operate in mutually opposite directions. This arrangement is prepared for use in the operation of the second piston 46 and a barrier valve 50 (described later).

The barrier valve 50 connected to a rod of the second piston 46 is a valve for opening and closing a fuel through hole 36 provided between the connector 32 and the fuel pipe 34 in the fuel filter. A distal end of the barrier valve 50 connected to the rod of the second piston 46 is resiliently supported by a spring 52, and a distal end of the barrier valve 46 nearest the fuel through hole 36 is provided with a valve surface 51. The valve surface 51 of the barrier valve 46 is mounted therein with a rubber packing 53 for tightly sealing the fuel through hole 36.

Furthermore, an external side of the oil chamber 44 that is disposed in the middle of the fuel filter side connecting part 42 is radially formed with a plurality of fuel flow holes 47 so that fuel from the fuel line 20 can move toward the fuel through hole 36 when the first piston 45 is moved by pressure of fuel applied from the fuel line 20.

Inlets 47a of the fuel flow holes 47 are respectively positioned at a place near the first piston 45 to be opened and closed by the operation of the first piston 45. In other words, when the first piston 45 is moved by the pressure of fuel from the fuel line 20, the inlets 47a of the fuel flow holes 47 are simultaneously opened, and the fuel is allowed to move toward the barrier valve 50 side via the fuel flow holes 47. A snap ring 48 is formed in the middle of the body 41 to prevent the first piston 45 from breaking away from the oil chamber 44 in response to the oil pressure in oil chamber 44.

Next, the operation of the sealing apparatus of the fuel filter thus constructed will be described.

Engines mounted in vehicles are pre-tested before being transferred to a finished vehicle assembly line. In the course of this process, the fuel filter is filled with a prescribed small amount of fuel for pre-testing the engines. The fuel does not leak via the connector 32 of the fuel filter 30 because of the sealing apparatus 40. As a result, the conventional method of blocking a connector of a fuel filter by using a separate cap or the like for preventing leakage of fuel in the course of pre-testing engines is omitted.

Consequently, the connector 32 of the connecting filter 30 prevents leakage of the remaining fuel used in starting the test in the course of an engine having passed the pre-starting test, being transferred to a finished vehicle assembly line and a fuel line of a fuel tank being connected at the finished vehicle assembly line.

When an engine is started for operating a vehicle, the first piston 45 is pushed by the pressure of the fuel transmitted from a fuel tank by a fuel pump via the fuel line 20, such that the first piston 45 is moved backwards and the inlets 47a of the fuel flow holes 47 are concurrently opened. As a result, the fuel supplied to the fuel line 20 flows toward the fuel through hole 36 via the fuel flow holes 47.

In the course of these processes, oil pressure is applied to the oil chamber 44 along with the backward motion of the first piston 45 to advance the second piston 46. The barrier valve 50 is moved to the left on the drawing along with the advance of the second piston 46 to open the closed fuel through hole 36, whereby the fuel moving toward the fuel through hole 36 flows to the fuel pipe 34 inside the fuel filter. The fuel flowing into the fuel pipe 34 of the fuel filter passes through filter elements within the fuel filter to be filtered.

Meanwhile, when an engine stops operating, the fuel pressure supplied to the fuel line is removed, and the second piston 46 and the barrier valve 50 start operating by the resilience of the spring 52 resiliently supporting the second piston 46.

In other words, the barrier valve 50 blocks the fuel through hole 36, and the second piston 46 is returned to its original position, thereby causing the first piston 45 to be situated at its original position. As a result, the first piston 45 returns to its original position and at the same time the inlets 47a of the fuel flow holes 47 are blocked. The first piston 45 is thereafter stopped by the snap ring 48 to keep maintaining the blocked state of the inlets 47a of the fuel flow holes 47.

When the barrier valve 50 maintains its blocked state, the fuel through hole 36 and the fuel flow holes 47 are simultaneously closed to have an effect of double sealing.

As apparent from the foregoing, there is an advantage in the sealing apparatus of a fuel filter thus described according to the embodiment of the present invention in that fuel leakage occurring via a connector of a fuel filter is prevented during an engine preliminary testing stage and also during finished vehicle assembly processes to thereby shorten the work process.

There is another advantage in that a double sealing is effected by a barrier valve and a first piston even after a vehicle ceases operation and the engine stops such that a phenomenon of fuel back flowing from a fuel filter to a fuel line is prevented.

What is claimed is:

1. A sealing apparatus of a fuel filter comprising:
   a body formed with a fuel filter side connecting part configured to be inserted into a connector of a fuel filter and a fuel line side connecting part configured to be connected to a fuel line;
   an oil chamber provided between a first piston and a second piston, the oil chamber located within an inner circumferential side of said fuel filter side connecting part of said body;
   fuel flow holes radially formed at an external side of said oil chamber, wherein inlets of said fuel flow holes are configured to be opened and closed by said first piston in response to a fuel pressure from said fuel line and to allow fuel passing through outlets of said fuel flow holes to flow to a fuel pipe in a fuel filter; and
   a barrier valve provided at one side of the body with a valve surface configured to open and close a fuel through-hole disposed between said fuel pipe in said fuel filter and said connector, wherein the second piston is coupled to the barrier valve on a side of the barrier valve opposite to the valve surface and the second piston is configured to move the valve surface in response to the fuel pressure from the fuel line;
   wherein one side of said oil chamber accommodating said second piston is formed in the shape of a double cylinder, and a distal end of the oil chamber is bent inwardly.

2. The sealing apparatus as defined in claim 1, wherein the valve surface of said barrier valve is mounted therein with a rubber packing.

3. The sealing apparatus as defined in claim 1, wherein a snap ring is formed on an inner circumferential surface of said body.

4. A sealing apparatus of a fuel filter comprising:
   a body formed with a fuel filter side connecting part configured to be inserted into a connector of a fuel filter and a fuel line side connecting part configured to be connected to a fuel line;
   an oil chamber located within an inner circumferential side of said fuel filter side connecting part of said body;
   a first piston between the fuel line and the oil chamber;
   a second piston between the oil chamber and a fuel filter; and a resilient spring coupled to the second piston and configured to return the second piston to a resting position;

wherein the first piston and the second piston are configured to move in opposite directions in response to a fuel pressure from fuel in the fuel line, thereby allowing fuel to flow from the fuel line to the fuel filter;

wherein one side of said oil chamber accommodating said second piston is formed in the shape of a double cylinder, and a distal end of the oil chamber is bent inwardly.

* * * * *